J. H. WAGENHORST.
VEHICLE WHEEL RIM.
APPLICATION FILED AUG. 16, 1912.
1,160,226.
Patented Nov. 16, 1915.
2 SHEETS—SHEET 2.
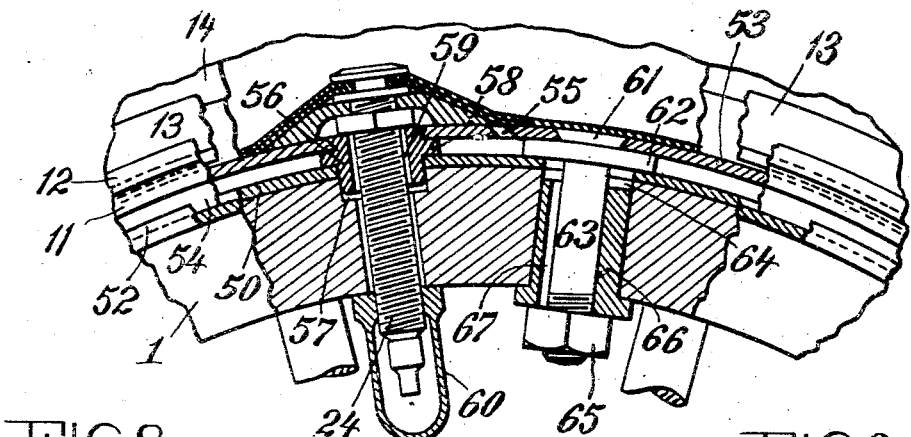
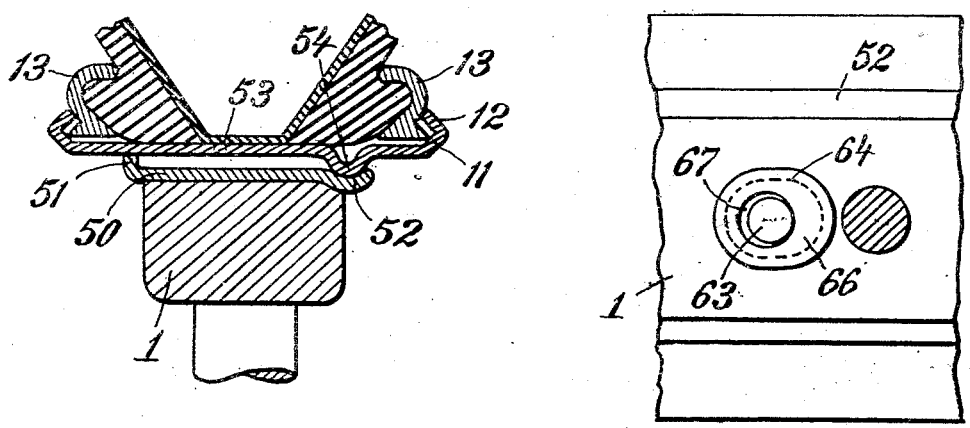
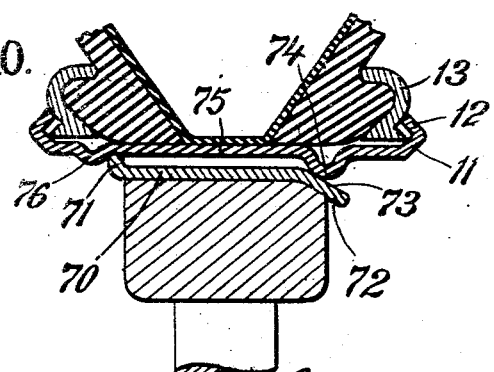
Attest:
Gerald E. Terwilliger
Edmund Quinney Morse
Inventor:
James H. Wagenhorst
by Edward Davis his Atty.

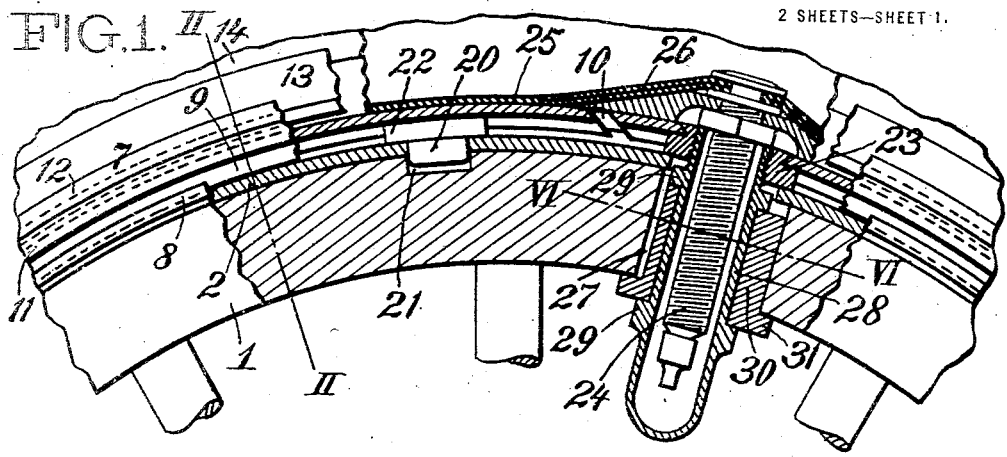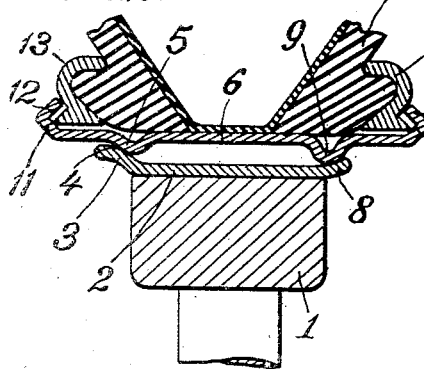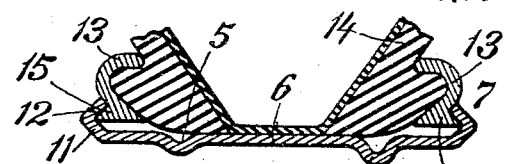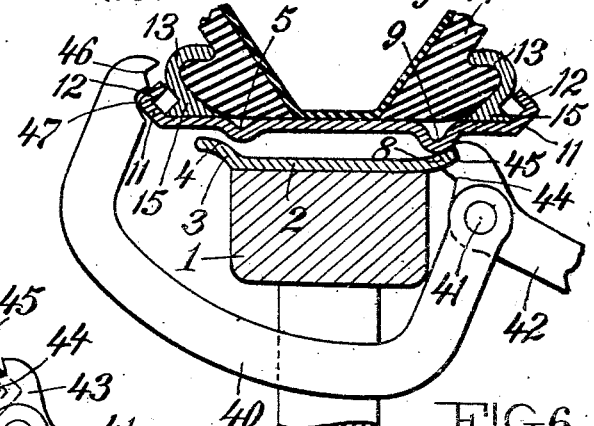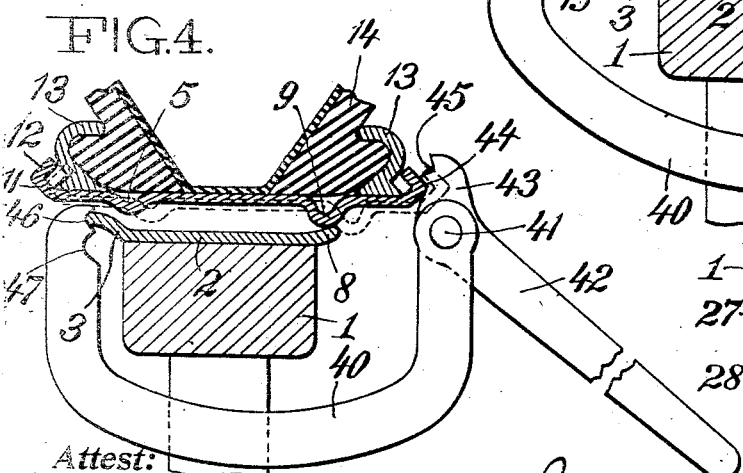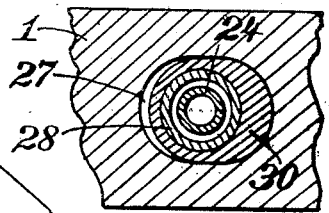

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,160,226.                    Specification of Letters Patent.        Patented Nov. 16, 1915.

Application filed August 16, 1912. Serial No. 715,364.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to improvements in vehicle wheel rims of the class known as demountable, in which a rim for carrying a pneumatic or other resilient tire is removably mounted upon a vehicle wheel. By the use of a rim of this character the changing of tires upon the wheel is greatly facilitated, as the removable rim carrying the tire can be taken off the wheel and replaced by a duplicate rim carrying a second tire. In this way, in case of an accident to the injured tire, the tire can be immediately replaced with an already inflated tire and the labor and delay incident to the removal of the tire from the rim and the placing of a new tire upon the rim and its inflation are thus obviated.

In accordance with my present invention I have provided a novel rim structure in which the elasticity of the tire or of the air in the tire, if the same be a pneumatic tire, is utilized first to prevent the collapse of the rim before the same is mounted upon the wheel, and after the rim has been placed upon the wheel to clamp the same thereupon. I also provide novel mechanical means for locking the rim upon the wheel.

In the accompanying drawings which form a part of this specification, Figure 1 is a side elevation of a portion of a vehicle wheel having a rim embodying one form of my invention applied thereto, parts being shown in section; Fig. 2 is a transverse section through the wheel felly, felly band, removable rim and base of a pneumatic tire, showing the rim clamped upon the wheel; Fig. 3 is a section through the rim and base of the tire showing the rim before being applied to the wheel; Fig. 4 is a view similar to Fig. 2, showing the rim being forced upon the wheel; Fig. 5 is a view similar to Fig. 4 showing the rim being removed from the wheel; Fig. 6 is a section on line VI—VI of Fig. 1; Fig. 7 is a view similar to Fig. 1 showing a modified form of my invention; Fig. 8 is a transverse section through the wheel felly, felly band, rim and base of the tire shown in Fig. 7; Fig. 9 is a plan view showing the under-side of a portion of the felly and rim shown in Fig. 7; Fig. 10 is a transverse sectional view of a wheel felly, felly band and rim illustrating another modified form of my invention.

Referring to the drawings in detail, and particularly to Figs. 1 to 6, inclusive, the numeral 1 designates the wooden felly of a vehicle wheel of ordinary construction, this felly being provided, as is customary, with a metallic felly band 2 shrunk or otherwise permanently secured thereon. It will be understood that in some forms of wheels, such as sheet metal wheels or wheels provided with wire spokes and metallic fellies, the separate felly band as such may be dispensed with and the metallic felly itself shaped to hold a tire-carrying rim. In the form of my invention shown in Figs. 1 to 6, the felly band 2 is provided at one side with a raised flange 3, the outer surface of which forms an annular seat 4 adapted to be engaged by a seat formed by a rib 5 rolled in the base 6 of the removable tire-carrying rim 7. At the other side the felly band 2 has a slightly turned-up flange 8 which is adapted to engage a seat formed by a rib 9 rolled in the rim base 6. It will be seen that the felly band 2 with its flanges 3 and 8 constitutes a shallow channel, and that as shown in Fig. 2, when the rim is clamped upon the felly band, the ribs 5 and 9 are received within this channel and the rim thus positively held against lateral movement in either direction. The rib 9 is preferably deeper than the rib 5, so that the seat formed by the former is of less diameter than the seat formed by the latter. The seat formed by the flange 8 is of correspondingly less diameter than the seat 4. The rim base 6 is transversely split as indicated at 10 in Fig. 1, and being made of steel or other suitable material is somewhat flexible or elastic, and is therefore capable of being expanded and contracted. The rim base has low flanges at each side thereof, preferably formed integral therewith by bending up the edges of the metal blank.
These flanges comprise the outwardly inclined or flaring portions 11 and the inwardly inclined or hooked portions or edges 12. Mounted upon the rim base 6 are the endless tire-retaining flanges 13 which are retained against lateral outward movement by the flanges of the rim base. The endless tire-retaining flanges 13 may be of any suitable shape, but are preferably made reversible so as to adapt the rim to carry either clencher or straight-sided tires, the particular shape of flange here illustrated being described and claimed in my application Serial No. 639,953. The tire-retaining flanges are shown in the drawings in engagement with the clenches or beads of an ordinary clencher tire 14. In the type of tire for which this rim is primarily designed, these clenches or beads are substantially inextensible, so that when the tire is mounted upon the rim it is impossible for the beads to be stretched sufficiently to permit the tire to come off over the tire-retaining flanges. To mount the tire upon the rim, the latter is removed from the wheel and the rim base contracted and its ends overlapped sufficiently to permit one of the tire-retaining flanges to be removed over one of the side flanges on the rim base. While the rim is thus collapsed the tire is placed over the rim base and the tire retaining flange restored to its position thereupon. The rim base is then expanded, the hooked portions 12 of its side flanges engaging and interlocking with the dove-tail-shaped bases 15 of the tire-retaining flanges 13. The tire may now be inflated, the pressure of the air in the tire urging the beads thereof apart and thus forcing the tire-retaining flanges 13 into engagement with the hooked portions 12 of the side flanges. Owing to the inward inclination of these portions and their engagement with the under-cut bases of the tire-retaining flanges, the latter positively prevent the collapse of the transversely split rim base. This construction thus requires no auxiliary means for positively locking together the ends of the rim base, although suitable means may be used for that purpose, if desired. The parts now occupy the relative positions shown in Fig. 3, and the rim bearing the inflated tire may be carried upon the vehicle until such time as it is necessary to apply it to the wheel.

When the rim is to be applied to the wheel, it is placed thereover as far as it will go, as indicated in dotted lines in Fig. 4, and then forced laterally thereupon. During this operation it will be seen that the rib 9 engages the edge of the flange 8 and rides up over the same, thus expanding the rim base within the endless tire-retaining flanges, as shown in Fig. 4. After the rib has passed the edge of the flange 8, the pressure of the air in the tire will contract the rim base and cause the rib 9 to slide down inside of the flange 8 until the ribs 5 and 9 seat firmly upon the felly band, as shown in Fig. 2. In this position, it will be seen that the rim base is firmly clamped upon the wheel by means of the pressure of the air in the tire, which not only acts directly upon the bottom of the rim base to contract the same, but also has the more important action of forcing the tire-retaining flanges 13 apart and thus causing them to slide up the inclined inner surfaces of the outwardly flaring portions 11 of the side flanges of the rim base. The bases of the endless flanges are shown in engagement with such inclined surfaces in Fig. 2. This engagement exerts a powerful force tending to contract the rim base upon the wheel. The rim being now clamped upon the felly band and within the channel formed by the flanges 3 and 8 thereof, by the many thousand pounds pressure, due to the pressure of the air within the tire, is attached to the wheel so firmly as to be fully able to withstand all the stresses to which it is subjected. No other locking means are necessary for the actual securing of the rim upon the wheel. To remove the rim and tire from the wheel, the rim is simply forced laterally, as indicated in Fig. 5. This causes the rib 9 to again ride over the edge of the flange 8, when the rim can be freely taken off. As soon as the rim is freed from its support by the felly band its parts will resume the relative position shown in Fig. 3.

While the resilience of the tire or the pressure of the air therein is sufficient to hold a rim upon the wheel, it is usually found desirable to provide auxiliary means for positively or mechanically locking the rim upon the wheel. This is particularly true in the case of pneumatic tires, as the puncture of the tire would relieve the pressure exerted by the same upon the rim base and the endless flanges. Any suitable means may be used for the purpose stated, but in Fig. 1 I have shown one construction well adapted for such use. As shown in this figure, I secure to one end of the rim base a lug 20 which is adapted to enter a recess 21 formed in the felly band and felly, this lug preferably having a flange 22 resting upon the surface of the felly band between the flanges 3 and 8 thereof. This lug 20 positively locks one end of the rim base against circumferential movement and thus anchors this end of the rim base and prevents creeping of the rim upon the wheel. The other end of the rim base has rigidly attached to it the lug 23 which preferably rests upon the surface of the felly band, as shown. This lug has a screw-threaded opening therein through which passes the valve stem 24 attached to the inner tube 25 of the tire 14 in the usual manner. The lug 23 is preferably placed close to the split in the rim base, so that the reinforced portion 26 of the inner tube adjacent to the valve stem or the valve stem clip will overlie the split in the rim base. This is not essential, but it is desirable, as it obviates the necessity of providing a shield to cover the split. The felly and felly band have an opening 27 therethrough in line with the opening through the lug 23, this opening being of sufficient size to permit the necessary circumferential movement of the valve stem when the rim is expanding and contracting. For this purpose the opening is preferably elongated or elliptical, as shown in Fig. 6.

In order to lock the end of the rim to the wheel and to hold the rim in contracted position when it is seated upon the felly band, I provide a sleeve 28 having a screw-threaded end adapted to screw into the threaded opening in the lug 23. The sleeve 28 may advantageously be formed to comprise a dust cap for protecting the valve stem, as shown. The sleeve is provided with spaced collars 29 and has rotatably mounted upon it, between these collars, an eccentric filler block 30 which substantially fills the hole 27 through the felly. When the sleeve 28 is screwed into the lug 23 the block 30 is drawn into the hole 27 and prevents the movement of the sleeve and consequently of the lug 23 in a direction to permit the expansion of the rim. The block 30 preferably has a flange 31 at its lower end adapted to engage the under-surface of the felly, so that when the sleeve 28 is screwed into the lug 33 it will draw the lug firmly upon the felly band and lock the end of the rim against radial movement. To mount the rim shown upon the wheel, the sleeve 28 carrying the block 30 is removed and the valve stem "button-holed" into the hole 27, the lug 20 at the same time entering its recess 21. The rim is then forced laterally upon the felly band, as already described, this being preferably accomplished by applying pressure to the rim by means of a suitable tool placed approximately diametrically opposite to the lug 20 and the valve stem. The rim, having been sprung or snapped into position in this manner, is contracted by the pressure of the tire and the sleeve 28 then placed in position and screwed into the lug 23. The block 30 enters the hole 27 and prevents the movement of the sleeve 28 therein, the flange 31 of the block seating against the felly. This clamps the end of the rim base in position and it is now impossible for the rim to become detached from the wheel, even though the tire becomes deflated. The hole 27 is preferably made of sufficient size to permit a slight play of the block 30 therein, as, the rims being interchangeable, the hole through the lug 23 may not always register exactly with the hole 27.

In Figs. 4 and 5 I have illustrated a form of tool which may be advantageously used for forcing the rim upon or removing it from the wheel. The tool comprises a U-shaped member 40 pivoted at 41 to a lever member 42. The lever member is suitably shaped to engage the side of the rim base when the rim is to be forced upon the wheel, or the side of the felly, or preferably the edge of the felly band, when the rim is to be removed. I find it desirable to provide in the short arm 43 of the lever member a pair of notches 44 and 45, the former being adapted to engage the edge of the rim base, as shown in Fig. 4, and thus force the rim upon the wheel, while the latter is adapted to engage the edge of the felly band, as shown in Fig. 5 when the rim is to be forced off. The end of the U-shaped member is similarly shaped to engage alternately the side of the rim base and the felly, or edge of the felly band. I preferably provide this member with a notch 46 adapted to engage the edge of the felly band, as shown in Fig. 4, and with a notch 47 adapted to engage the side of the rim base, as shown in Fig. 5. The use of the two notches in the lever member and U-shaped member is not essential but better locates the parts of the tool in the two positions in which it is used.

In Figs. 7, 8 and 9 I have shown a modified form of my invention in which the wheel felly 1 has a felly band 50 mounted thereon, this band having an upturned flange 51 at one edge thereof adapted to provide a raised seat to support one side of the tire-carrying rim, the other side of the felly band having a shallow channel 52 rolled therein. 53 is the rim base which has a single rib 54 rolled therein, this rib being adapted to be received in the channel 52 and thus hold the rim against lateral movement in either direction. The rim base 53 is transversely split at 55, as shown in Fig. 7, and is provided with the side flanges comprising the outwardly inclined portions 11 and the inwardly hooked portions 12, as in the case of the form of my invention previously described. Endless tire-retaining flanges 13 are used which coöperate with the side flanges on the rim base in the manner already fully set forth. The principle of operation of this form of my invention is exactly the same as that of the form already described and a description of the operation need not therefore be repeated.

Figs. 7 and 9 show a modified means for securing the ends of the rim base in position. For this purpose one end of the rim base carries a lug 56 which is received in a recess 57 in the felly, the lug preferably having a flange portion 58 resting upon the surface of the felly band. The lug 56 has a hole 59 therein through which passes the valve stem 24 of the tire. The valve stem also passes through an alined hole in the felly and is preferably provided with a dust cap 60 of ordinary construction. The other end of the rim base has permanently secured thereto a lug 61, which is preferably provided with a flange 62 resting upon the surface of the felly band, this lug having projecting therefrom a screw-threaded stud or bolt 63. The latter passes through an elongated opening 64 in the felly and is adapted to be secured in position by means of a nut 65, the nut and stud thus serving to lock the end of the rim base to the felly. The hole 64 is made of sufficient size to permit the necessary circumferential movement of the stud 63 therein as the rim base expands and contracts in being forced or snapped upon its seat on the felly band. In order to positively lock the rim base against expansion while it is in position upon the felly band, I may, if desired, use a filling block 66 which may be inserted in the opening 64, the block having a hole 67 therein to receive the stud 63. The thickness of the block between the stud 63 and the wall of the hole 64 more remote from the split in the rim is sufficient to prevent the stud from moving in that direction enough to permit the rim to be removed from the wheel. Thus to take off the rim it is essential to first remove the block 66. The hole 67 through the block is preferably eccentrically located as shown in order to provide this extra thickness of metal back of the stud, and is made somewhat larger than the stud so as to allow for a slight variation in position thereof.

In Fig. 10 I have shown another modification of my invention in which the rim base and felly band are of somewhat different configuration from the forms already described, but in which the principle of operation is exactly the same. In this figure 70 is the felly band which has an upturned flange 71 at one side thereof forming a raised seat for the rim, the other side of the felly band having a downwardly turned flange 72 forming a beveled seat 73 adapted to be engaged by a rib 74 rolled in the rim base 75. The rim base has a second and smaller rib 76 rolled therein, which, when the rim is applied to the felly band, is forced or snapped over the flange 71 into the position shown in Fig. 10. In this position it serves to lock the rim base against lateral removal from the felly band. The rim base is locked against lateral movement in the opposite direction by the engagement of the rib 74 with the beveled seat 73 of the felly band. Thus the rim base is locked against lateral movement upon the felly band in either direction, the structure shown being the equivalent of the structures illustrated in Figs. 2 and 8, in the first of which the rim base is provided with a pair of ribs which are received between the sides of a channel formed by the flanges at the edges of the felly band, while in Fig. 8, the rim base is provided with a single rib received in a channel formed for the purpose at one side of the felly band.

I have illustrated and described in detail certain preferred embodiments of my invention in order to explain the nature of the same, but I believe that my invention involves a novel principle in rim construction, and I realize that this principle may be embodied in numerous structures other than those particularly set forth. I intend to claim my invention broadly and do not wish to be restricted to the specific details described and illustrated any further than as specified in certain of the more limited claims hereunto appended.

Having thus described my invention, I claim:

1. The combination with a vehicle wheel of an expansible and contractible tire-carrying rim and a resilient tire mounted upon said rim, said rim and wheel being provided with an interlocking means comprising projecting engaging devices on said rim said projections being unequal, the diameter of the rim at the engaging device being less than the diameter of the periphery of the wheel.

2. The combination with a vehicle wheel of an expansible and contractible rim, and a resilient tire mounted on said rim, said rim when carrying said tire and before being mounted upon said wheel being of less diameter than the diameter of the periphery of said wheel, said rim and said wheel having oppositely disposed projecting portions adapted to slide over one another, said portions having faces adapted to engage and thereby lock the rim and wheel together.

3. The combination of a vehicle wheel having a channel in its periphery, an expansible and contractible rim having a channel-engaging portion projecting behind the base of said rim, a resilient tire mounted upon said rim, said tire permitting said rim to resiliently yield to and thereby be urged over the wall of said channel, and means for positively locking said rim in such position.

4. The combination of a vehicle wheel having a raised seat at one side of its periphery, and having a depressed channel formed at the other side of its periphery, an expansible and contractible tire-carrying rim having a portion adapted to seat upon said raised seat and having an inwardly projecting portion adapted to be received in said depressed channel and to lock said rim against lateral movement in either direction upon said wheel, and a resilient tire mounted upon said rim, the inwardly projecting portion of said rim when the latter is forced laterally upon the wheel engaging the outer wall of said channel and expanding the rim against the pressure of the tire sufficiently to permit said inwardly projecting portion to pass over the outer wall of said channel and seat within the latter, the pressure of the tire holding said rim contracted upon the wheel.

5. The combination with a vehicle wheel of an expansible and contractible tire-carrying rim comprising a transversely split rim base and endless tire-retaining flanges, and a resilient tire mounted upon said rim, said rim and said wheel having oppositely disposed projecting members providing an interlocking means, said rim when forced laterally upon the wheel being thereby expanded in diameter, and when mounted thereupon being adapted to be clamped by the pressure of the tire.

6. A removable tire-carrying rim for vehicle wheels comprising a transversely split rim base having flanges at each side thereof, said flanges comprising outwardly inclined or flared portions with inwardly inclined or hooked edges, and endless tire-retaining flanges mounted upon said rim base having portions adapted to interlock beneath said inwardly hooked edges.

7. The combination of a vehicle wheel, a tire-carrying rim comprising a transversely split rim base having flanges at each edge thereof, said flanges having outwardly inclined or flared portions and inwardly inclined or hooked edges, and endless tire-retaining flanges mounted upon said rim base, and a resilient tire mounted upon said rim, said tire-retaining flanges having portions adapted to interlock beneath the inwardly hooked edges of the side flanges of said rim base when the rim is removed from the wheel, portions of said tire-retaining flanges engaging the outwardly inclined or flared portions of the side flanges of said rim base when the tire-carrying rim is being mounted upon said wheel, whereby the pressure of the tire forcing said tire-retaining flanges apart causes the same to ride up the inclined surfaces of the outwardly inclined or flared portions of the side flanges of said rim base and contract the rim base upon the wheel periphery.

8. In a vehicle wheel, in combination, a felly, a felly band thereon having an outwardly extending flange at one side thereof and having a depressed channel at the other side thereof, a tire-carrying rim having a portion adapted to seat on the periphery of said outwardly turned flange, and having an inwardly projecting portion adapted to be received in the channel in said felly band, and means for contracting said rim upon said felly band, comprising an endless tire-retaining flange.

9. In a vehicle wheel, in combination, a felly, a felly band thereon having an outwardly extending flange at one side thereof and having a depressed channel at the other side thereof, a tire-carrying rim comprising a transversely split rim base having a portion adapted to seat on the periphery of said outwardly extending flange and having an inwardly extending portion adapted to be received in said channel, endless tire-retaining flanges mounted upon said rim base, and means for contracting said rim base upon said felly band.

10. In a vehicle wheel, in combination, a felly, a felly band thereon having an outwardly extending flange at one side thereof, and having a depressed channel at the other side thereof, a tire-carrying rim comprising a transversely split rim base having a portion adapted to seat upon the periphery of said outwardly extending flange and having an inwardly projecting portion adapted to be received in said channel, side flanges formed at the edges of said rim base, each of said flanges comprising an outwardly inclined or flared portion and an inwardly inclined or hooked edge, endless tire-retaining flanges mounted upon said rim base having portions adapted to interlock beneath the inwardly hooked edges of said side flanges when the rim is removed from the wheel, and a resilient tire mounted upon said rim.

11. The combination of a vehicle wheel having a recess therein, a transversely split tire-carrying rim removably mounted upon said wheel and having a lug on one end thereof adapted to be received in the said recess, a stud on the other end of said rim projecting through a hole in said wheel, and a filling block adapted to be inserted in said hole to limit the movement of said stud.

12. In a vehicle wheel, in combination, a fixed wheel member having a recess therein and having an annular depressed channel therein, a transversely split tire-carrying rim mounted upon said member having an annular rib projecting inwardly therefrom adapted to be received in said channel and prevent lateral movement of said rim upon the member, said rim having a lug at one end thereof adapted to be received in said recess and having a stud at the other end thereof projecting through a hole in said member, said hole being of sufficient size to permit a limited circumferential movement of said stud therein, and a filling block adapted to be inserted in said hole between said stud and the walls of said hole, whereby the movement of said stud is limited and the expansion of said rim to an extent sufficient to permit the rib thereon to come out of the channel in the member of the wheel is prevented.

13. In a vehicle wheel, in combination, a fixed wheel member having an annular channel in its periphery and having a recess therein and a radial hole therethrough concentric with said recess, and a second radial hole therethrough adjacent to said recess and the first radial hole, a transversely split tire-carrying rim mounted upon said member and having an inwardly projecting rib adapted to be received in the channel in said member and prevent lateral movement of said rim in either direction upon said member, said rim having a lug near one end thereof adapted to be received in the recess in the member, said lug having a hole therethrough alined with the first hole through the member, said rim having attached to its other end a stud projecting through the second hole in said member, means for locking said stud in said hole, and a pneumatic tire mounted upon said rim, the valve stem of said tire passing through the alined holes in said lug and the member of the wheel.

14. The combination of a vehicle wheel having annular flanges at the edges thereof providing a channel, an expansible and contractible rim having inwardly projecting ribs adapted to contact with the flanges of said wheel, said ribs and said flanges being of unequal diameter, the rib of smaller diameter being adapted to pass over the flange of greater diameter and to be seated against the rear face thereof.

15. The combination of a vehicle wheel having flanges at the edges thereof providing a channel, an expansible and contractible rim having annular ribs projecting inwardly therefrom and spaced to contact with the walls of said flanges, said ribs and said flanges being of unequal diameter, the rib of larger diameter being adapted to contact with the flange of larger diameter, and the rib of smaller diameter being adapted to pass over and seat behind the flange of smaller diameter.

16. The combination with a vehicle wheel of an expansible and contractible tire-carrying rim, said wheel and rim providing an interlocking means comprising projecting engaging members on said rim and wheel including a rib member on said rim and a flange member on said wheel, the rib member of smaller diameter being adapted to be urged behind the flange of greater diameter and to seat against the inner face thereof, said rim being provided with outwardly inclined flanges having inwardly inclined or hooked edges and endless tire-retaining flanges mounted upon said rim base.

JAMES H. WAGENHORST.

Witnesses:
EDMUND QUINCY MOSES,
OLIVER WILLIAMS.